(12) United States Patent
Chen et al.

(10) Patent No.: US 11,940,573 B1
(45) Date of Patent: Mar. 26, 2024

(54) NAVIGATION-COMMUNICATION-INTEGRATED METAMATERIAL SONAR FOR UNDERWATER VEHICLES

(71) Applicants: QINGDAO INNOVATION AND DEVELOPMENT CENTER OF HARBIN ENGINEERING UNIVERSITY, Qingdao (CN); HARBIN ENGINEERING UNIVERSITY, Harbin (CN)

(72) Inventors: Yongyao Chen, Qingdao (CN); Xin Wang, Harbin (CN); Junjie Li, Qingdao (CN); Liang Zhang, Harbin (CN); Zedong Ma, Harbin (CN)

(73) Assignees: QINGDAO INNOVATION AND DEVELOPMENT CENTER OF HARBIN ENGINEERING UNIVERSITY, Qingdao (CN); HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/446,877

(22) Filed: Aug. 9, 2023

(30) Foreign Application Priority Data

Feb. 23, 2023 (CN) .......................... 202310152222.4

(51) Int. Cl.
  *G01S 7/524* (2006.01)
  *G01S 7/52* (2006.01)
  *G01S 7/521* (2006.01)

(52) U.S. Cl.
  CPC .......... *G01S 7/524* (2013.01); *G01S 7/52092* (2013.01); *G01S 7/521* (2013.01)

(58) Field of Classification Search
  CPC .......... G01S 15/06; G01S 7/251; G01S 7/524; G01S 7/52092
  See application file for complete search history.

(56) References Cited

U.S. PATENT DOCUMENTS

| 5,995,882 A * | 11/1999 | Patterson | ................ B63B 27/36 |
| | | | 701/532 |
| 2008/0038061 A1* | 2/2008 | Morse | .................. F03B 17/025 |
| | | | 440/9 |

(Continued)

FOREIGN PATENT DOCUMENTS

| CN | 107543570 A | 1/2018 |
| CN | 107991644 A | 5/2018 |

(Continued)

OTHER PUBLICATIONS

Shi Yang et al., "Advances in integrated technology of underwater acoustic communication, navigation, and positioning of submarines," Journal of Harbin Engineering University, Jan. 2023, vol. 44, No. 1.

(Continued)

*Primary Examiner* — Daniel L Murphy
*Assistant Examiner* — Amie M Ndure
(74) *Attorney, Agent, or Firm* — Piloff Passino & Cosenza LLP; Rachel K. Piloff; Sean A. Passino

(57) ABSTRACT

A navigation-communication-integrated metamaterial sonar for underwater vehicles is provided, and belongs to the field of ocean detection and communication. The metamaterial sonar is a metamaterial composite structure including a group of disc array with the same diameters, a disc backboard and water gaps. By adjusting the period p of the disc array, a board thickness t1 of each disc, the thickness g of each water gap, the radius $w_1$ of the disc array, the radius $w_2$ and the thickness $t_2$ of the backboard, the working states of underwater navigation and underwater acoustic communication may be flexibly switched by changing working frequencies, and the navigation-communication-integrated sonar may be realized.

10 Claims, 22 Drawing Sheets

(56) References Cited

U.S. PATENT DOCUMENTS

| | | | | |
|---|---|---|---|---|
| 2008/0272605 | A1* | 11/2008 | Borden | B63B 17/00 |
| | | | | 290/55 |
| 2009/0031940 | A1* | 2/2009 | Stone | G01S 15/93 |
| | | | | 367/909 |
| 2012/0099395 | A1* | 4/2012 | Debrunner | G01S 15/89 |
| | | | | 367/21 |
| 2012/0099399 | A1* | 4/2012 | Lichter | G01S 7/521 |
| | | | | 367/93 |
| 2012/0099402 | A1* | 4/2012 | Debrunner | G06V 20/64 |
| | | | | 367/134 |
| 2016/0266250 | A1* | 9/2016 | Dillon | G01S 15/58 |
| 2018/0108964 | A1 | 4/2018 | Adas et al. | |
| 2021/0323257 | A1 | 10/2021 | O'Keefe | |
| 2022/0082690 | A1 | 3/2022 | Lee et al. | |
| 2023/0078347 | A1* | 3/2023 | Sheldon-Coulson | C25B 1/04 |
| | | | | 205/637 |

FOREIGN PATENT DOCUMENTS

| | | |
|---|---|---|
| CN | 109737992 A | 5/2019 |
| CN | 111060913 A | 4/2020 |
| CN | 215706956 U | 2/2022 |
| CN | 114203146 A | 3/2022 |
| CN | 114265048 A | 4/2022 |
| CN | 114284713 A | 4/2022 |
| CN | 115085838 A | 9/2022 |
| WO | 2022241207 A1 | 11/2022 |

OTHER PUBLICATIONS

Lu Wei et al., "Design and optimization of a sub-wavelength unidirectional transmission structure for underwater acoustic waves with multiple incident directions," Journal of Shaanxi Normal University (Natural Science Edition), Nov. 2019, vol. 47, No. 6.

Wang Guang-Yue, "Overall Structural Design of Large Depth Unmanned Underwater Vehicle," Jan. 2019, pp. 128-131.

Liu Zhenghua et al., "Overview of foreign naval equipment technology development in 2020," National Defense Technology Industry, Dec. 2020, No. 12.

Search Report for China Application No. 202310152222.4.

Office Action for China Application No. 202310152222.4, dated Apr. 3, 2023.

Notice to Grant for China Application No. 202310152222.4, dated Apr. 28, 2023.

* cited by examiner

NAVIGATION-COMMUNICATION-INTEGRATED METAMATERIAL SONAR FOR UNDERWATER VEHICLES

CROSS-REFERENCE TO RELATED APPLICATIONS

This application claims priority to Chinese Patent Application No. 202310152222.4, filed on Feb. 23, 2023, the contents of which are hereby incorporated by reference.

TECHNICAL FIELD

The disclosure belongs to the field of ocean exploration and communication, and in particular to a navigation-communication-integrated metamaterial sonar for underwater vehicles.

BACKGROUND

Underwater vehicles have important disclosure potential in obtaining marine information, developing marine resources, protecting marine environment and preventing marine disasters. The navigation and communication systems is an important equipment of underwater vehicles, which is an important technical means for obtaining marine information, signal processing, information emission and communication. However, in the existing unmanned underwater vehicle (UUV) information system platform, the navigation sonar and underwater acoustic communication system usually need to be designed and configured separately, which leads to a series of problems such as large sizes, heavy weight, increased power consumption, reduced concealment and electromagnetic interference. Restricted by factors such as load capacity, endurance and cost, the navigation and communication system carried by UUV urgently needs to be compact, lightweight, low energy consumption and low cost. It's difficult for the current technology to take these needs into account. In view of the current technical challenges and urgent needs, the focus of future research and development is to realize an integrated system that is capable of combine navigation sonar with underwater acoustic communication equipment. This technology may significantly reduce the proportion of platform volume, reduce weight and power consumption, effectively improve the integration degree of UUV sonar equipment, and significantly enhance the underwater navigation, communication and maneuverability of UUV.

It is worth mentioning that at present, the research on UUV navigation-communication-integrated sonar mainly focuses on the waveform design of detection and communication, self-interference suppression technology and signal processing technology shared by detection and communication. However, using acoustic metamaterials to design the navigation-communication integrated sonar is still blank. Many scientific and technical problems need to be explored and solved, so it is urgent to carry out basic and applied research in related fields. The UUV navigation-communication-integrated sonar system based on acoustic metamaterials provided by the disclosure will provide a new idea for UUV sonar and equipment integrated technology.

SUMMARY

In view of this, in order to solve the technical problems mentioned in the above background, the present disclosure aims to propose a navigation-communication-integrated metamaterial sonar for underwater vehicles.

In order to achieve the above objectives, the disclosure adopts the following technical scheme: a navigation-communication-integrated metamaterial sonar for underwater vehicles, including a disc array and a backboard. The disc array includes a group of uniformly arranged discs with the same diameters, same intervals and overlapped axes, and the disc array is located at one side of the backboard. Water gaps are arranged between the backboard and the disc array and between two adjacent discs of the disc array. Thicknesses g of multiple water gaps are same, and a transducer is placed at an axial center of one water gap of the disc array. The transducer emits and receives underwater acoustic signals in two ways: receiving and emitting combined or separated. By adjusting a period p of the disc array, a board thickness $t_1$ of each disc, a thickness g of each water gap, a radius $w_1$ of the disc array, a radius $w_2$ and a thickness $t_2$ of the backboard, working states of underwater navigation and underwater acoustic communication are flexibly switched by changing working frequencies, and a navigation-communication-integrated sonar is realizable.

Further, the radius $w_1$ of the disc array is 10-50 mm, the period p is 20-55 mm, the board thickness $t_1$ of each disc is 7-30 mm, the thickness g of each water gap is 6-25 mm, and the radius $w_2$ of the backboard is 18-80 mm, and the thickness $t_2$ of the backboard is equal to the board thickness $t_1$ of the each disc in the disc array.

Further, the transducer is an emitting-receiving combined transducer; a number of the discs in the disc array of a high directivity sonar is 20, an underwater navigation working frequency band is 15-20 kHz, an underwater acoustic communication working frequency band is 21-24 kHz, the radius $w_1$ of the disc array is 22.5 mm, the period p is 30 mm; the board thickness $t_1$ of the each disc is 16 mm; the thickness g of the each water gap is 14 mm, and the radius $w_2$ of the backboard is 45 mm.

Further, the transducer is the emitting-receiving combined transducer; the number of the discs in the disc array of the high directivity sonar is 18, the underwater navigation working frequency band is 7-10 kHz, the underwater acoustic communication working frequency band is 11-13 kHz, the radius $w_1$ of the disc array is 45 mm, the period p is 55 mm; the board thickness $t_1$ of each disc is 30 mm; the thickness g of each water gap is 25 mm, and the radius $w_2$ of the backboard is 80 mm.

Further, the transducer is an emitting-receiving separated transducer; the number of the discs in the disc array of the high directivity sonar is 16, the underwater navigation working frequency band is 25-30 kHz, the underwater acoustic communication working frequency band is 32-36 kHz, the radius $w_1$ of the disc array is 15 mm, the period p is 20 mm; the board thickness $t_1$ of each disc is 11 mm; the thickness g of each water gap is 9 mm, and the radius $w_2$ of the backboard is 35 mm.

Further, the transducer is the emitting-receiving combined transducer; the number of the discs in the disc array of a compact sonar is 10, the underwater navigation working frequency band is 5-8 kHz, the underwater acoustic communication working frequency band is 12-17 kHz, the radius $w_1$ of the disc array is 40 mm, the period p is 53 mm; the board thickness $t_1$ of each disc is 28 mm; the thickness g of the each water gap is 25 mm, and the radius $w_2$ of the backboard is 75 mm.

Further, the transducer is the emitting-receiving combined transducer; the number of the discs in the disc array of the compact sonar is 10, the underwater navigation working frequency band is 16-17 kHz, the underwater acoustic communication working frequency band is 22-25 kHz, the radius $w_1$ of the disc array is 22.5 mm, the period p is 30 mm; the board thickness $t_1$ of the each disc is 16 mm; the thickness g of the each water gap is 14 mm, and the radius $w_2$ of the backboard is 45 mm.

Further, the transducer is the emitting-receiving separated transducer; the number of the discs in the disc array of the compact sonar is 10, the underwater navigation working frequency band is 35-39 kHz, the underwater acoustic communication working frequency band is 42-45 kHz, the radius $w_1$ of the disc array is 10 mm, the period p is 13 mm; the board thickness $t_1$ of the each disc is 7 mm; the thickness g of the each water gap is 6 mm, and the radius $w_2$ of the backboard is 18 mm.

Further, the disc array and the backboard are made of metal.

Further, when adopting the emitting-receiving separated transducer, a hydrophone is placed at a sixth water gap counted from the backboard towards the disc array; when adopting the emitting-receiving combined transducer, the hydrophone is placed at a fifth water gap counted from the backboard towards the disc array.

Compared with the prior art, the navigation-communication-integrated metamaterial sonar for underwater vehicles has the following beneficial effects.

Firstly, the metamaterial sonar provided by the embodiment realizes the transformation of detection and communication beams in different frequency bands by using the band gap characteristics of one-dimensional phononic crystals, so that the working states of underwater detection and underwater acoustic communication may be flexibly switched, and the metamaterial structure design and corresponding acoustic characteristics are used to realize the integration of detection and communication.

Secondly, the metamaterial sonar provided by the embodiment has a compact structure and small volume, and may be used in array; by changing structural parameters, array structure, filling rate and material parameters, the frequency and width of the acoustic band gap may be adjusted and controlled, and the design is flexible to meet practical needs.

Lastly, the metamaterial sonar proposed by the embodiment use a set of hardware equipment to realize the functions of detection sonar and underwater acoustic communication, and at the same time the metamaterial sonar may reduce the volume ratio and weight of the system, reduce electromagnetic interference, enhance concealment and improving the integrated performance of the system, and has the potential to be applied to small and medium-sized underwater vehicles with limited load capacity and endurance.

BRIEF DESCRIPTION OF THE DRAWINGS

The accompanying drawings, which constitute a part of the disclosure, are used to provide a further understanding of the disclosure, and the illustrative embodiments of the disclosure and the descriptions are used to explain the disclosure, and do not constitute an improper limitation of the disclosure. In the drawings.

DETAILED DESCRIPTION OF THE EMBODIMENTS

Figure 1:
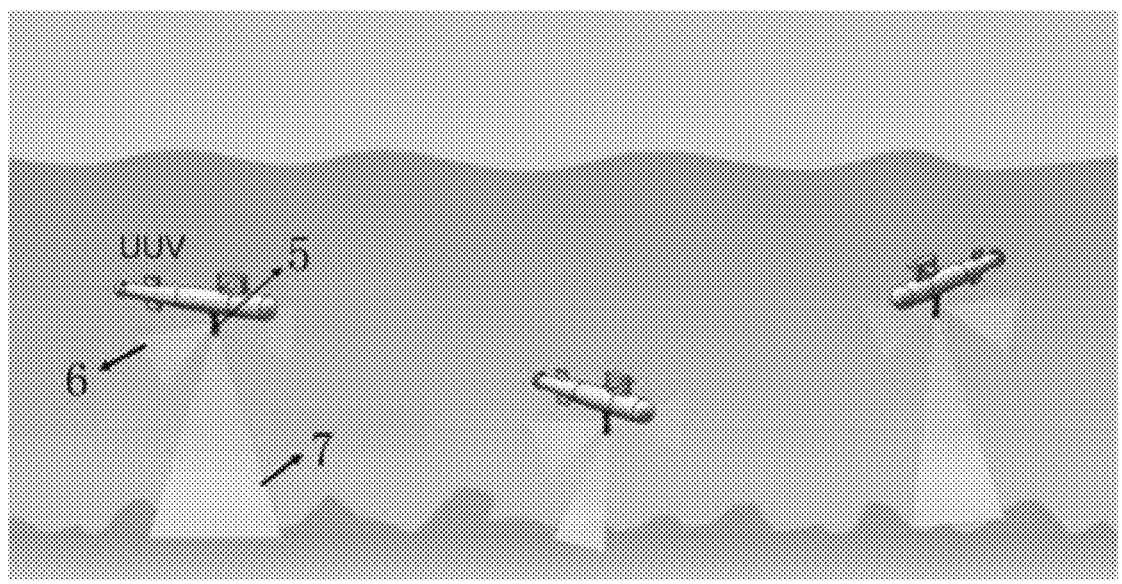
FIG. 1 is a schematic diagram of the metamaterial sonar used for navigation and communication of underwater vehicles.

In the following, the technical scheme in the embodiments of the present disclosure will be clearly and completely explained with the drawings. It should be noted that, in the case of no conflict, the embodiments in the present disclosure and the features in the embodiments may be combined with each other, and the described embodiments are only part of the embodiments of the present disclosure, but not all of them.

These embodiments are explained with reference to FIGS. 1-9H. A navigation-communication-integrated metamaterial sonar for underwater vehicles includes a disc array 2 and a backboard 1, where the disc array 2 includes a group of uniformly arranged discs with same diameters, same intervals and overlapped axes (the disc array 2 visually forms a disc column with equal gaps), and the disc array 2 is located at one side of the backboard 1. Water gaps 3 are arranged between the backboard 1 and the disc array 2 and between two adjacent discs of the disc array 2. Thicknesses g of multiple water gaps 3 are same, and a transducer 4 is placed at an axial center of one water gap 3 of the disc array 2; the transducer 4 emits and receives underwater acoustic signals in two ways: receiving and emitting combined or separated; by adjusting a period p of the disc array 2, a board thickness $t_1$ of each disc, a thickness g of each water gap 3, a radius $w_1$ of the disc array 2, a radius $w_2$ and a thickness $t_2$ of the backboard 1, working states of the underwater navigation and underwater acoustic communication are flexibly switched by changing working frequencies, and a navigation-communication-integrated sonar may be realized.

Optionally, the radius $w_1$ of the disc array 2 is 10-50 mm, the period p is 20-55 mm, the board thickness $t_1$ of each disc is 7-30 mm, and the thickness g of each water gap 3 is 6-25 mm.

Optionally, the radius $w_2$ of the backboard 1 is 18-80 mm, and the thickness $t_2$ of the backboard 1 is equal to the board thickness $t_1$ of each disc in the disc array 2.

Embodiment 1

The transducer 4 is an emitting-receiving combined transducer; the number of the discs in the disc array 2 of the high directivity sonar is 20; the underwater detection working frequency band is 15-20 kHz; the underwater acoustic communication working frequency band is 21-24 kHz; the radius $w_1$ of the disc array 2 is 22.5 mm; the period p is 30 mm; the board thickness $t_1$ of each disc is 16 mm; the thickness g of the water gap 3 is 14 mm; the radius $w_2$ of the backboard 1 is 45 mm; the thickness $t_2$ of the backboard 1 is equal to the board thickness $t_1$ of each disc in the disc array 2, which is 16 mm; the distance between the backboard 1 and the disc array 2 is equal to the thickness g of the water gap 3 between the adjacent discs in the disc array 2, which is 14 mm.

Embodiment 2

The transducer 4 is an emitting-receiving combined transducer; the number of the discs in the disc array 2 of the high directivity sonar is 18; the underwater detection working frequency band is 7-10 kHz; the underwater acoustic communication working frequency band is 11-13 kHz; the radius $w_1$ of the disc array 2 is 45 mm; the period p is 55 mm; the board thickness $t_1$ of each disc is 30 mm; the thickness g of each water gap 3 is 25 mm; the radius $w_2$ of the backboard is 80 mm; the thickness $t_2$ of the backboard 1 is equal to the board thickness $t_1$ of each disc in the disc array 2, which is 30 mm; the distance between the backboard 1 and the disc array 2 is equal to the thickness g of the water gap 3 between the adjacent discs in the disc array 2, which is 25 mm.

Embodiment 3

The transducer 4 adopts an emitting-receiving separated transducer; the number of the discs in the disc array 2 of the high directivity sonar is 16; the underwater detection working frequency band is 25-30 kHz; the underwater acoustic communication working frequency band is 32-36 kHz; the radius $w_1$ of the disc array 2 is 15 mm; the period p is 20 mm; the board thickness $t_1$ of each disc is 11 mm; the thickness g of each water gap 3 is 9 mm; the radius $w_2$ of the backboard is 35 mm; the thickness $t_2$ of the backboard 1 is equal to the board thickness $t_1$ of each disc in the disc array 2, which is 11 mm; the distance between the backboard 1 and the disc array 2 is equal to the thickness g of the water gap 3 between the adjacent discs in the disc array 2, which is 9 mm.

Embodiment 4

The transducer 4 is an emitting-receiving combined transducer; the number of the discs in the disc array 2 of the compact sonar is 10; the underwater detection working frequency band is 5-8 kHz; the underwater acoustic communication working frequency band is 12-17 kHz; the radius $w_1$ of the disc array 2 is 40 mm; the period p is 53 mm; the board thickness $t_1$ of each disc is 28 mm; the thickness g of each water gap 3 is 25 mm; the radius $w_2$ of the backboard 1 is 75 mm; the thickness $t_2$ of the backboard 1 is equal to the board thickness $t_1$ of each disc in the disc array 2, which is 28 mm; the distance between the backboard 1 and the disc array 2 is equal to the thickness g of the water gap 3 between the adjacent discs in the disc array 2, which is 25 mm.

Embodiment 5

The transducer 4 is an emitting-receiving combined transducer; the number of the discs in the disc array 2 of the compact sonar is 10; the underwater detection working frequency band is 16-17 kHz; the underwater acoustic communication working frequency band is 22-25 kHz; the radius $w_1$ of the disc array 2 is 22.5 mm; the period p is 30 mm; the board thickness $t_1$ of each disc is 16 mm; the thickness g of each water gap is 14 mm; the radius $w_2$ of the backboard 1 is 45 mm; the thickness $t_2$ of the backboard 1 is equal to the board thickness $t_1$ of each disc in the disc array 2, which is 16 mm; the distance between the backboard 1 and the disc array 2 is equal to the thickness g of the water gap 3 between the adjacent discs in the disc array 2, which is 14 mm.

Embodiment 6

The transducer 4 adopts an emitting-receiving separated transducer; the number of the discs in the disc array 2 of the compact sonar is 10; the underwater detection working frequency band is 35-39 kHz; the underwater acoustic communication working frequency band is 42-45 kHz; the radius $w_1$ of the disc array 2 is 10 mm; the period p is 13 mm; the board thickness $t_1$ of each disc is 7 mm; the thickness g of each water gap 3 is 6 mm; the radius $w_2$ of the backboard 1 is 18 mm; the thickness $t_2$ of the backboard 1 is equal to the board thickness $t_1$ of each disc in the disc array 2, which is 7 mm; the distance between the backboard 1 and the disc array 2 is equal to the thickness g of the water gap 3 of the adjacent discs in the disc array 2, which is 6 mm.

The disc array 2 and the backboard 1 are made of metal.

FIG. 1 is a schematic diagram of the underwater working principle of the navigation-communication-integrated metamaterial sonar for underwater vehicles proposed by the disclosure. A plurality of metamaterial sonars may be used for underwater vehicles, and a plurality of underwater working nodes may complete information interaction and communication through the metamaterials sonars, and may also complete detection and navigation by themselves, thereby realizing the integration of underwater navigation and communication functions, reducing the volume proportion and weight of the platform and improving the resource utilization rate. As shown in FIG. 1, when the sonar changes the emission signal frequency, the emission signal beam directivity of the sonar changes obviously. When the beam directivity of the sonar is concentrated below UUV (vertically oriented beam), the sonar may be used for underwater depth and terrain detection (navigation mode). When the sonar directivity is transformed into UUV lateral radiation (horizontal quasi-omnidirectional emission) and there is almost no emission signal below the sonar, the sonar may be used for information interaction and communication between underwater multi-nodes. Therefore, the metamaterial sonar may realize the integration of navigation and communication functions, which is helpful to reduce the proportion and weight of the platform and save energy consumption.

The integration of underwater detection and communication has become one of the research hotspots in the marine field in recent years. The navigation-communication-integrated metamaterial sonar for underwater vehicles provided by the disclosure is small in volume, simple in structure, and may be arranged in an array, so that the effective regulation of the emission signal beam is realized, and it is expected to be applied to the integrated navigation and communication of underwater vehicle, providing a new research idea and technology for the integration of underwater detection and communication, and having a good engineering disclosure prospect.

Figure 2:
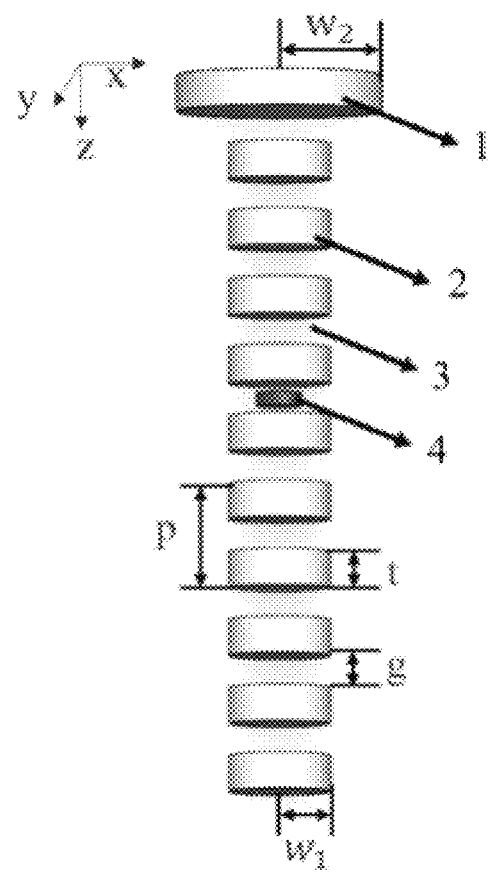
FIG. 2 is a schematic structural diagram of the metamaterial sonar.

As shown in FIG. 2, the navigation-communication-integrated metamaterial sonar for underwater vehicles proposed by the present disclosure is a metamaterial composite structure, including a group of disc array 2 with the same diameters, a disc backboard 1 and water gaps 3 between the backboard and the disc array 2 and the adjacent discs of the disc array 2; the period is p, and the thickness of each disc is $t_1$; the thickness of each water gap 3 is g; the radius of that disc array 2 is $w_1$; the radius of the backboard 1 is $w_2$; the thickness $t_2$ of the backboard 1 is equal to the board thickness $t_1$ of each disc in the disc array 2. The distance between the backboard 1 and the disc array 2 is equal to the thickness g of the water gap 3 between the adjacent discs in the disc array 2.

In the metamaterial sonar, the transducer 4 is placed at the axial center of one of the water gaps 3 of the disc array 2, and the emitting-receiving combined transducer or the emitting-receiving separated transducer may be used for signal emission and reception. When the transducer 4 adopts the emitting-receiving separated transducer, the hydrophone is placed at the sixth water gap 3 counted from the backboard 1 towards the disc array 2; when the transducer 4 is the emitting-receiving combined transducer, the hydrophone is placed at the fifth water gap 3 counted from the backboard 1 towards the disc array 2.

The metamaterial sonar is arranged periodically along the z-axis direction and is homogeneous material in the x-axis and y-axis directions, so the metamaterial sonar may be considered as a one-dimensional phononic crystal structure.

Figure 3:
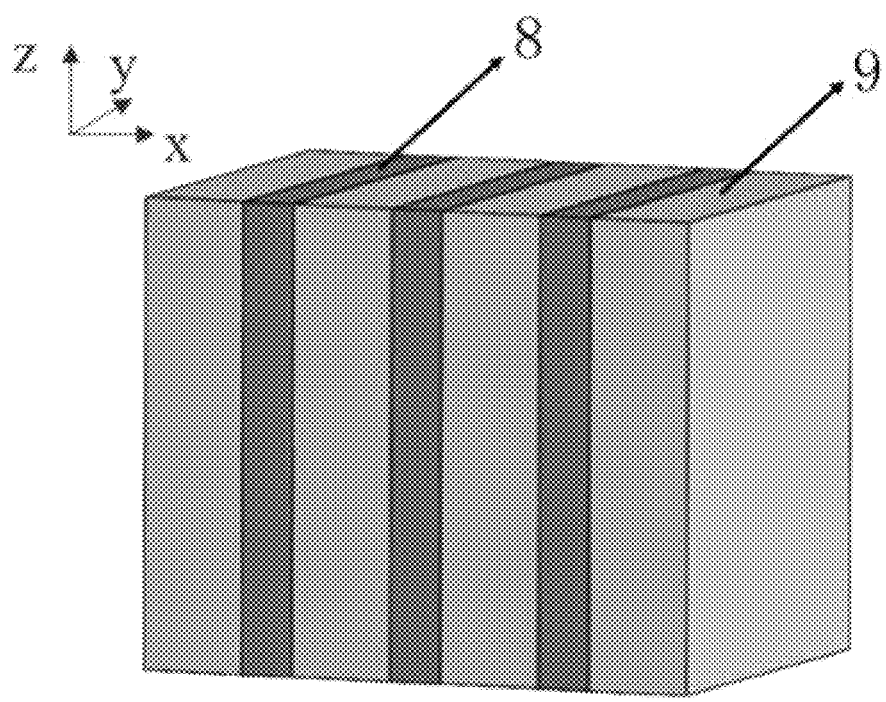
FIG. 3 is a schematic structural diagram of one-dimensional phononic crystal metamaterial.

The structural schematic diagram of one-dimensional phononic crystal is shown in FIG. 3, and the phononic crystal is formed by alternating distribution of low-density fluid 8 and high-density solid 9 media. The disclosure utilizes the acoustic band gap effect existing in one-dimensional phononic crystals to realize the design of navigation-communication-integrated metamaterial sonar.

Figure 4A:
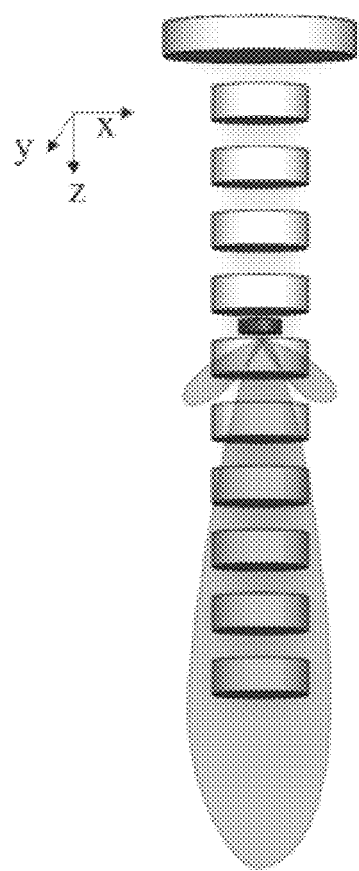
FIG. 4A is a schematic diagram of the metamaterial sonar emitting a vertically oriented beam when the working state is underwater detection (navigation mode).
Figure 4B:
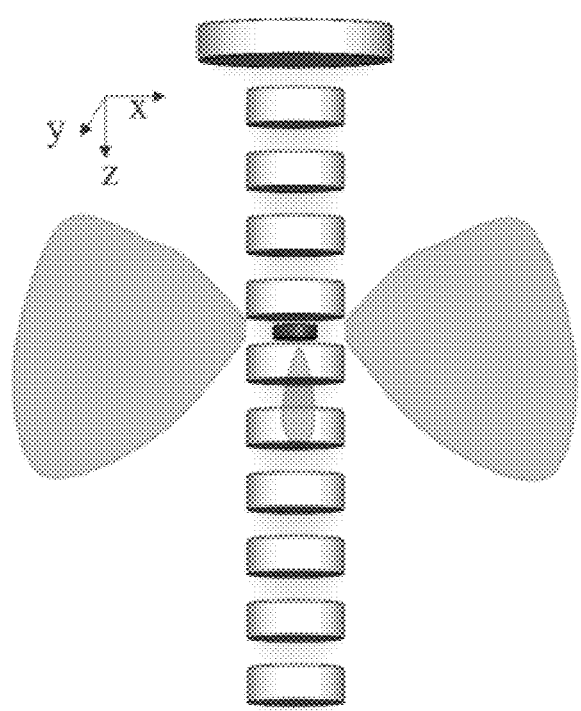
FIG. 4B is a schematic diagram of the metamaterial sonar emitting a horizontal quasi-omnidirectional beam when the working state is underwater acoustic communication (communication mode).

As shown in FIG. 4A and FIG. 4B, the center working frequency of the navigation-communication-integrated metamaterial sonar for underwater vehicles proposed by the disclosure is 22 kHz, 16-17 kHz is the acoustic emission passband of the metamaterial sonar, and the emission beam is concentrated downward radiation, which may be used for underwater depth and terrain detection (navigation mode) (FIG. 4A). The working frequency band is 22-25 kHz, which is the emission forbidden band of the metamaterial sonar (emission along the z direction is forbidden), and the sound wave may not be emitted along the z direction through the disc array 2, so the beam is transformed into a butterfly-shaped beam (quasi-horizontal omnidirectional radiation) radiating around, and this working mode may be used as underwater acoustic communication sonar (FIG. 4B). The period p of the disc array 2 of the metamaterial sonar, the board thickness $t_1$ of each disc, the thickness g of the water gap 3 and the processing materials all have influence on regulating and controlling the working frequency and bandwidth of the metamaterial sonar.

Figure 5:
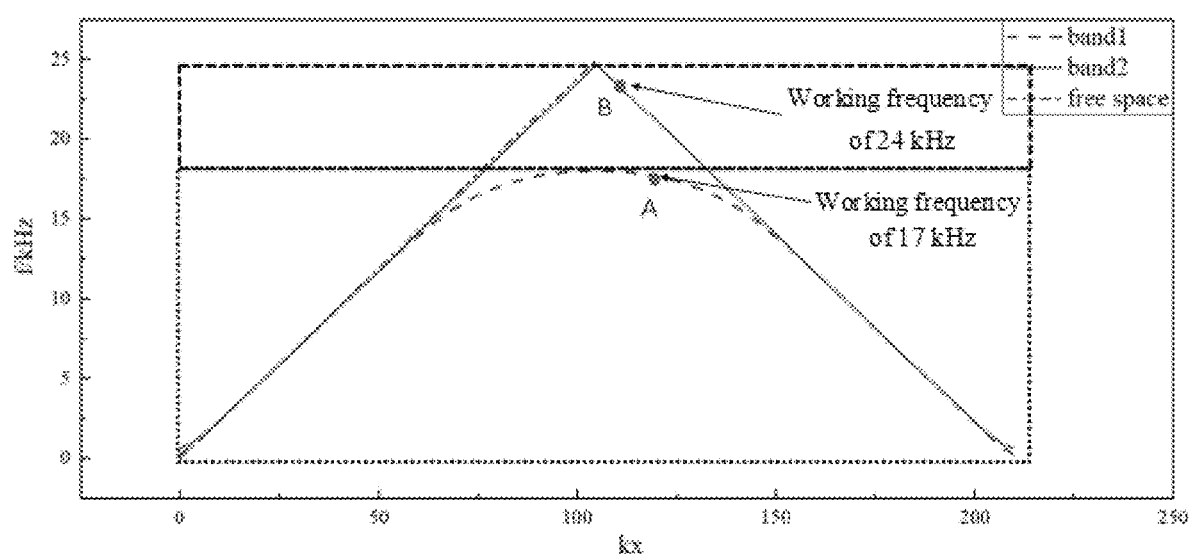
FIG. 5 is an acoustic band gap dispersion curve of metamaterial sonar.

FIG. 5 is a phononic crystal acoustic band gap dispersion curve when the metamaterial sonar does not include the backboard. From the acoustic band gap dispersion curve of the metamaterial sonar, it may be clearly known that the upper area is the acoustic emission conduction band of the metamaterial sonar, and the acoustic wave (for example, the working frequency of the acoustic wave is 17 kHz) in this passband may form directional beam emission and radiation along the Z axis of the disc array 2. The lower area in FIG. 5 is the acoustic wave emission forbidden band of the metamaterial sonar, and the acoustic wave (for example, the working frequency is 24 kHz) in this forbidden band may not be emitted along the Z axis of the disc array 2, and only the acoustic wave may be radiated by butterfly-shaped beams on both sides of the disc array 2.

Figure 6:
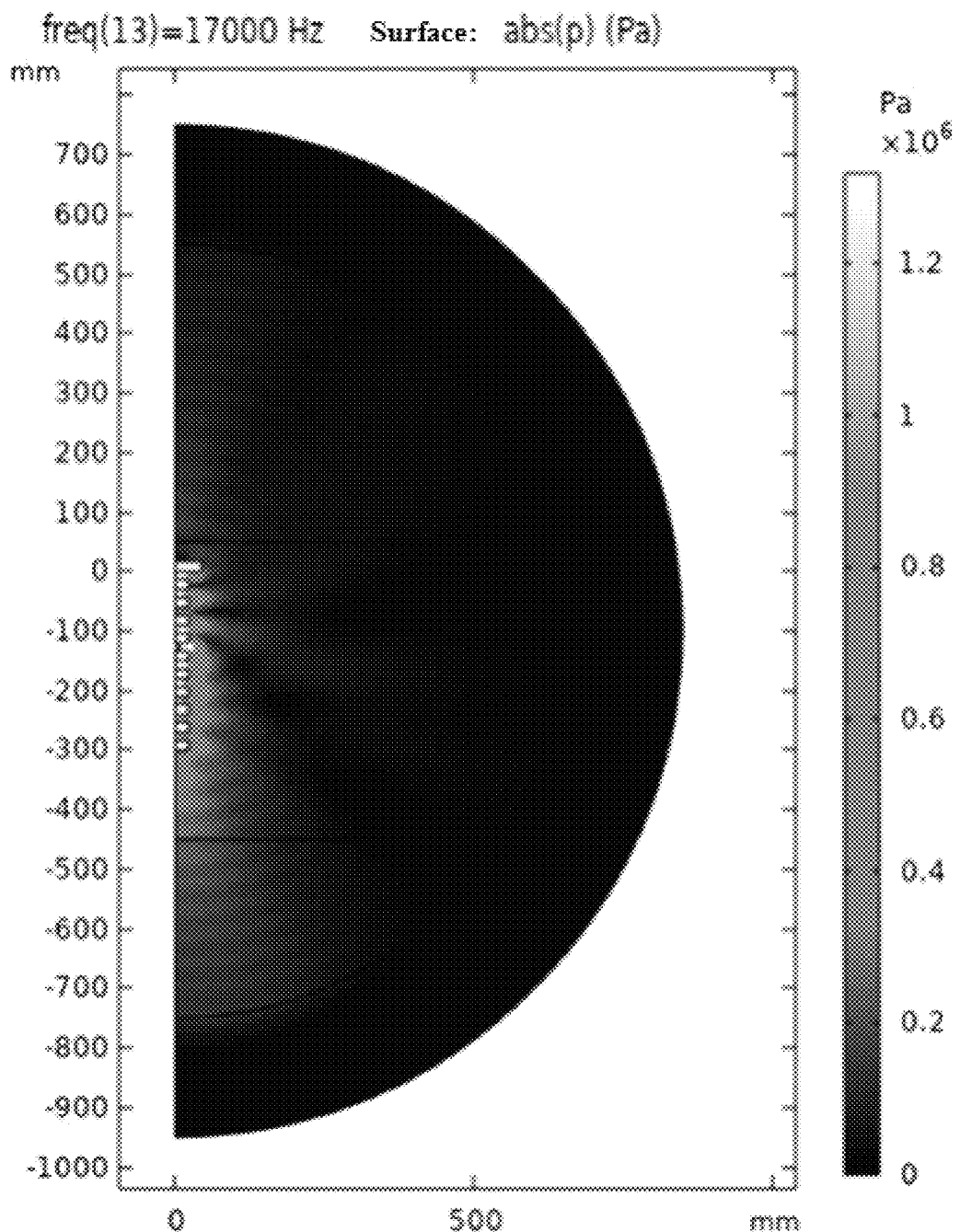
FIG. 6 is a schematic diagram of the sound field distribution of sonar emitting beam (working frequency is 17 kHz) in the conduction band of phononic crystal metamaterials.
Figure 7:
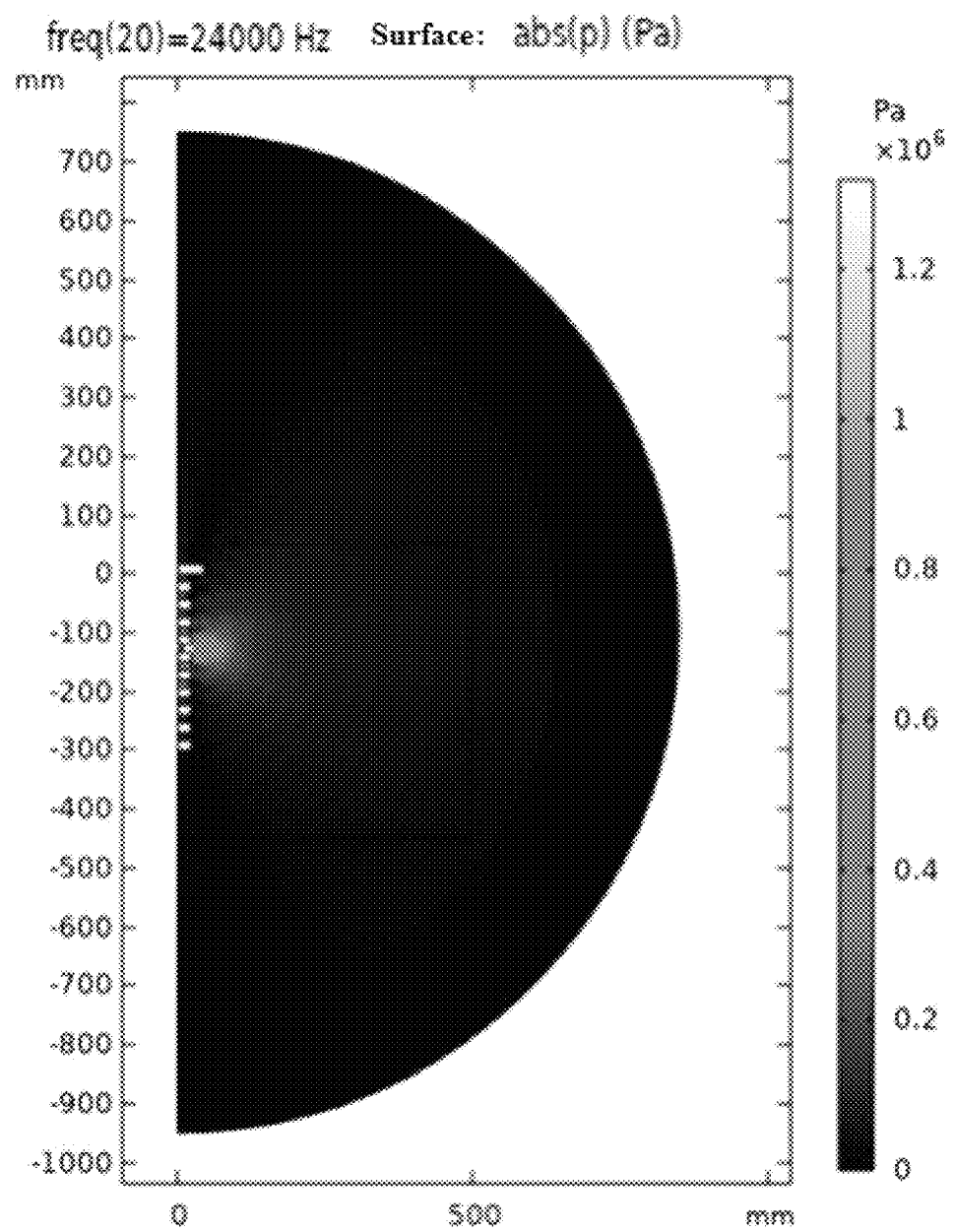
FIG. 7 is a schematic diagram of the sound field of sonar emitting beam (working frequency is 24 kHz) in the forbidden band of phononic crystal metamaterials.
Figure 8A:
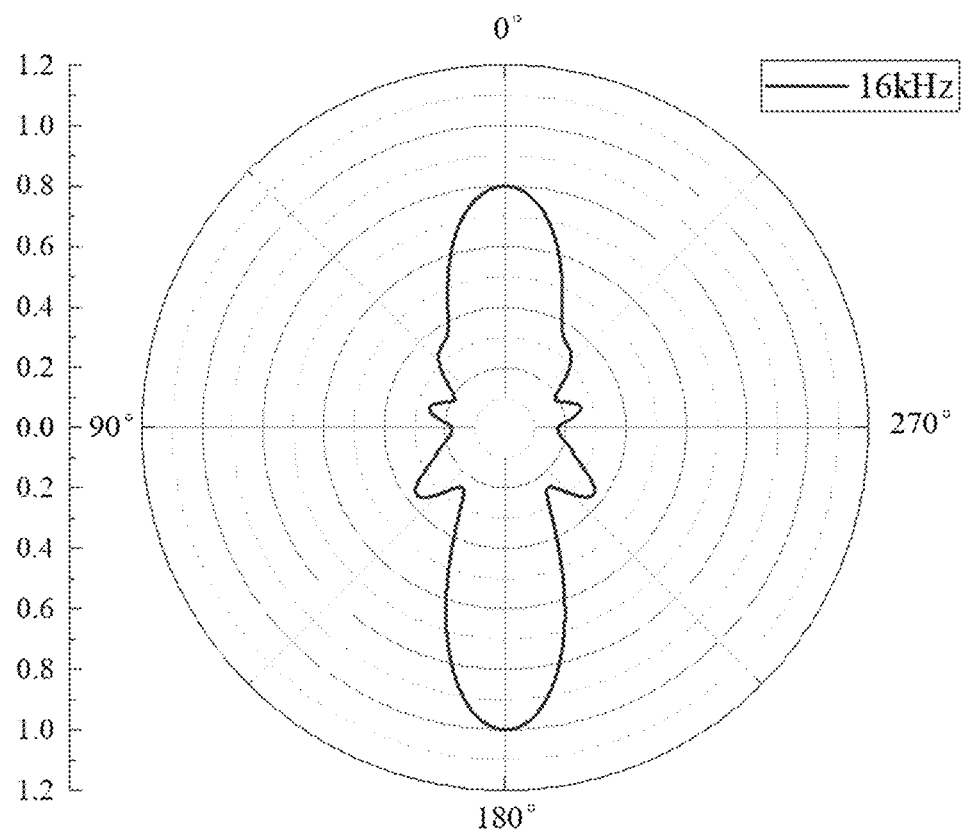
FIG. 8A shows the simulation results of beam transformation of metamaterial sonar at the working frequency of 16 kHz.
Figure 8B:
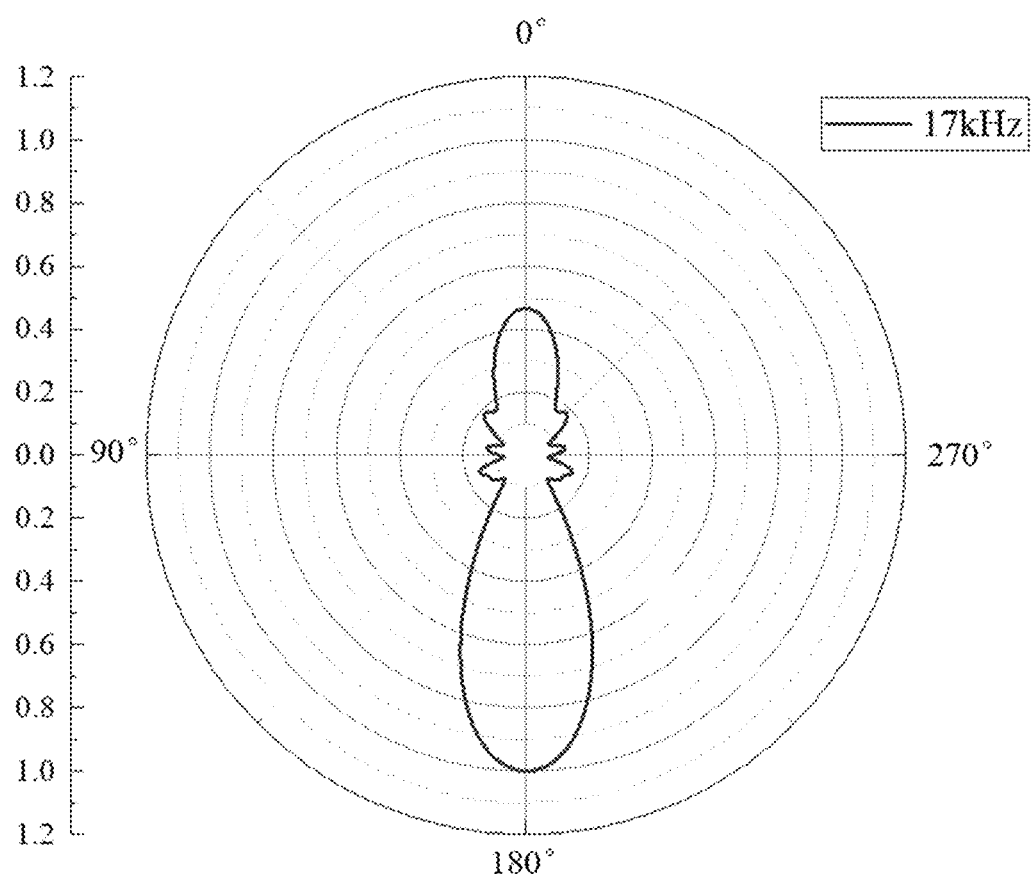
FIG. 8B shows the simulation results of beam transformation of metamaterial sonar at the working frequency of 17 kHz.
Figure 8C:
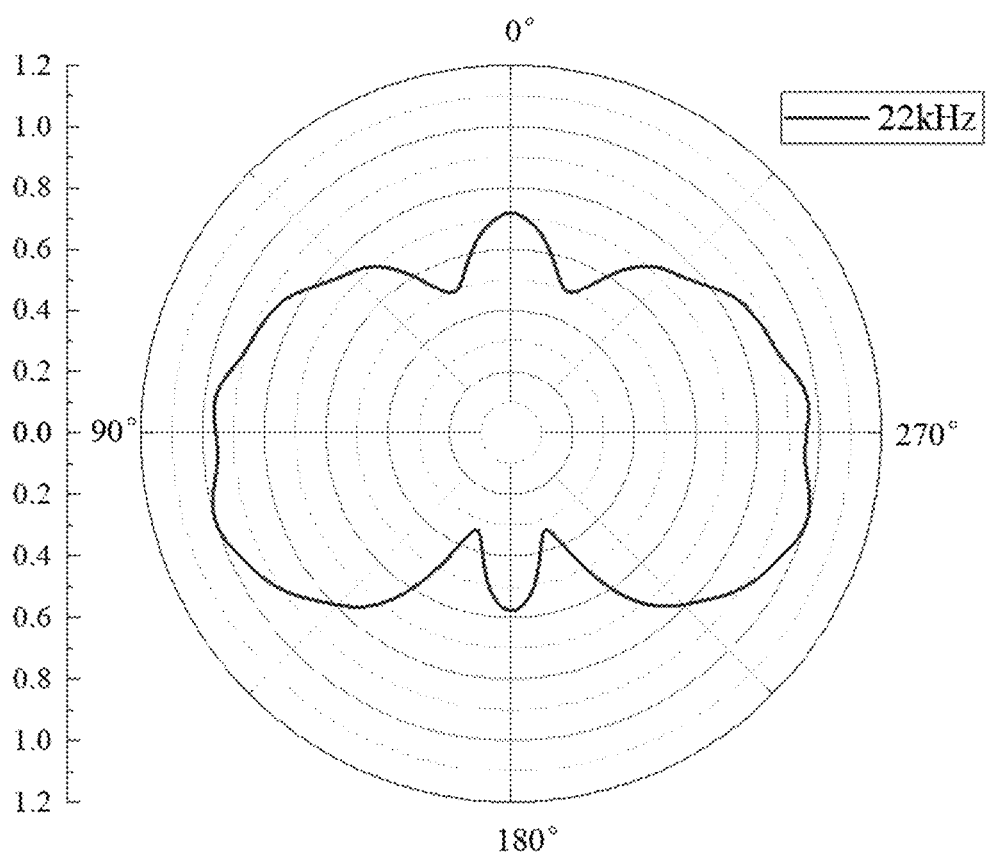
FIG. 8C shows the simulation results of beam transformation of metamaterial sonar at the working frequency of 22 kHz.
Figure 8D:
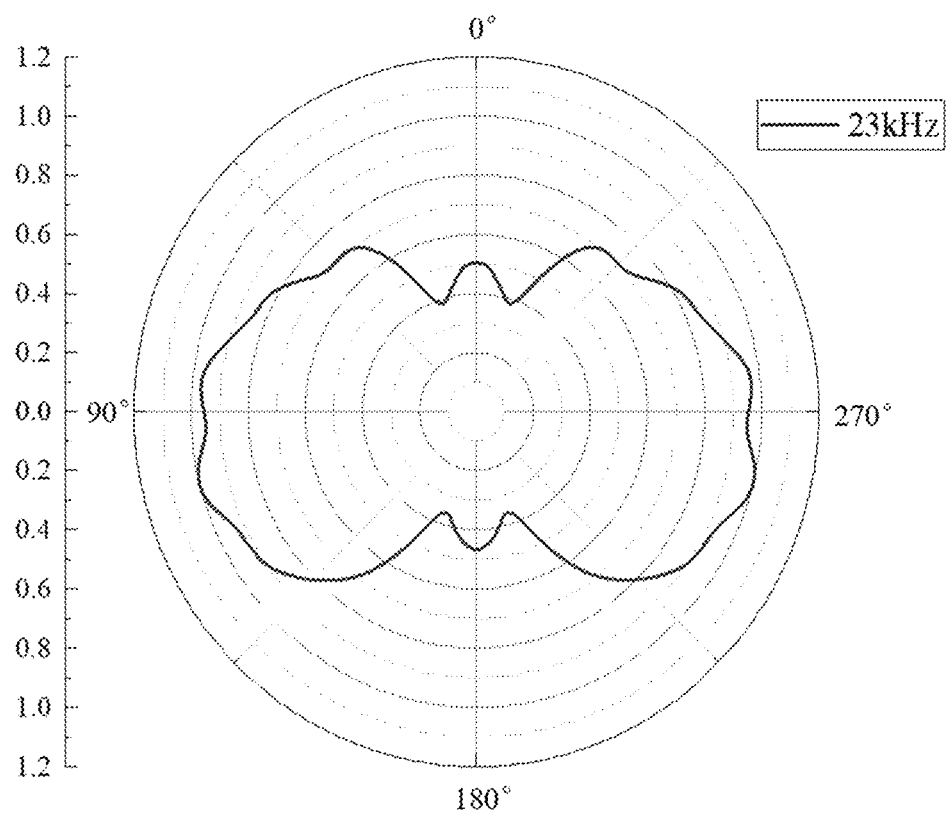
FIG. 8D shows the simulation results of beam transformation of metamaterial sonar at the working frequency of 23 kHz.
Figure 8E:
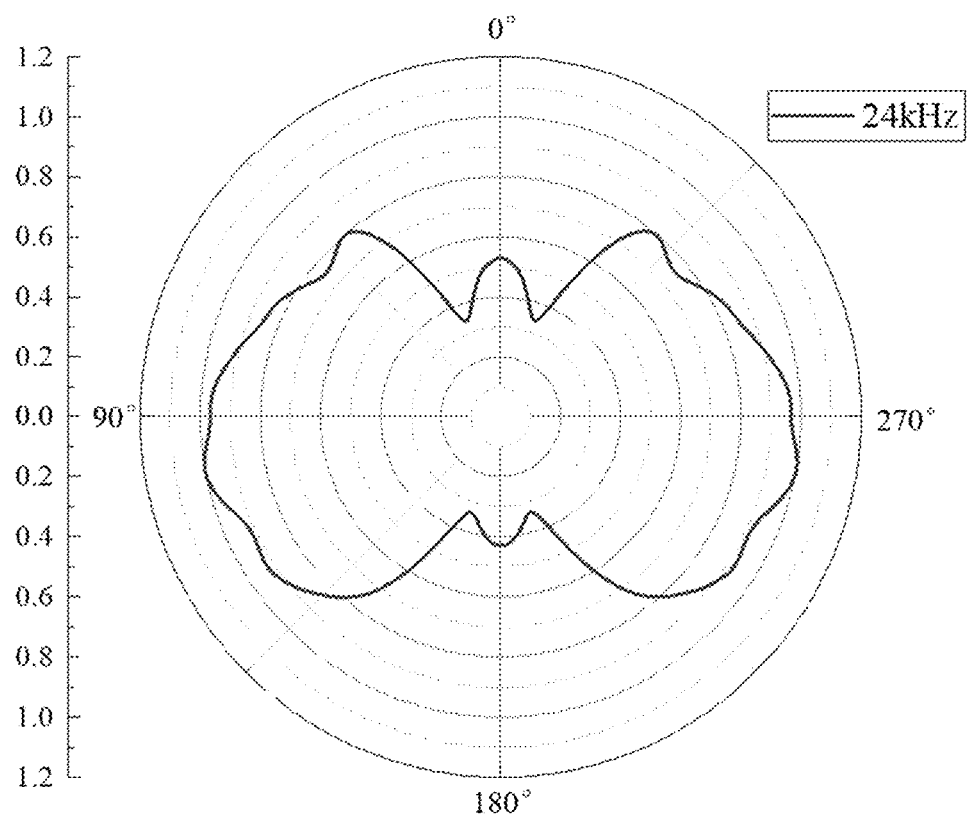
FIG. 8E shows the simulation results of beam transformation of metamaterial sonar at the working frequency of 24 kHz.
Figure 8F:
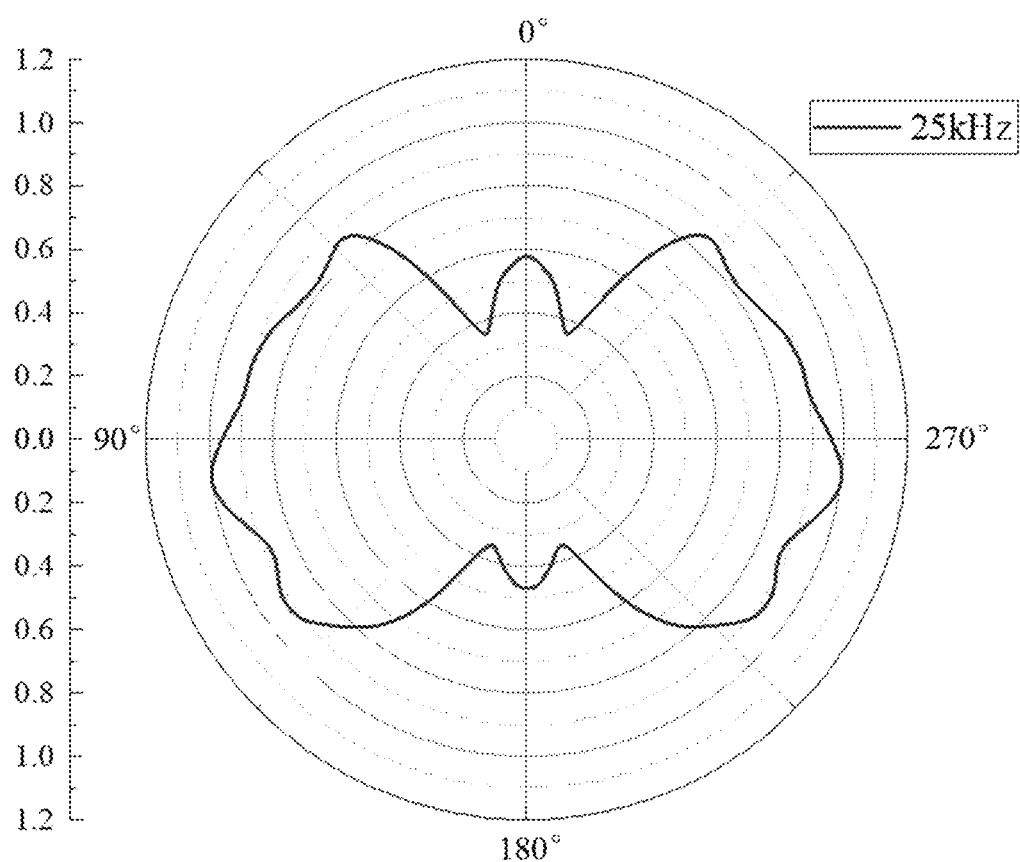
FIG. 8F shows the simulation results of beam transformation of metamaterial sonar at the working frequency of 25 kHz.
Figure 9A:
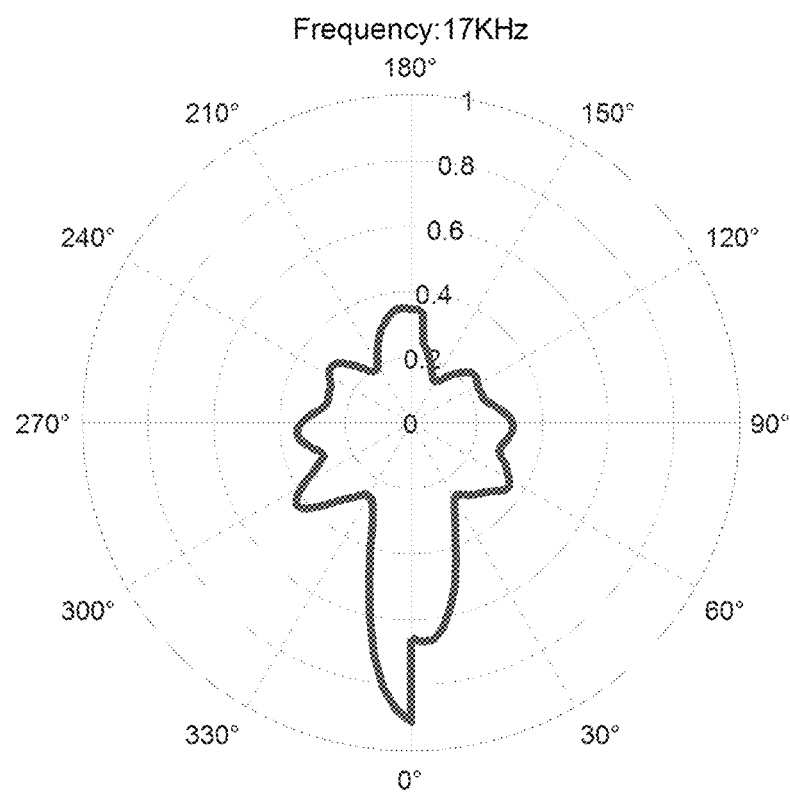
FIG. 9A shows the beam pattern results of metamaterial sonar in the underwater test at the emission signal frequency of 17 kHz.
Figure 9B:
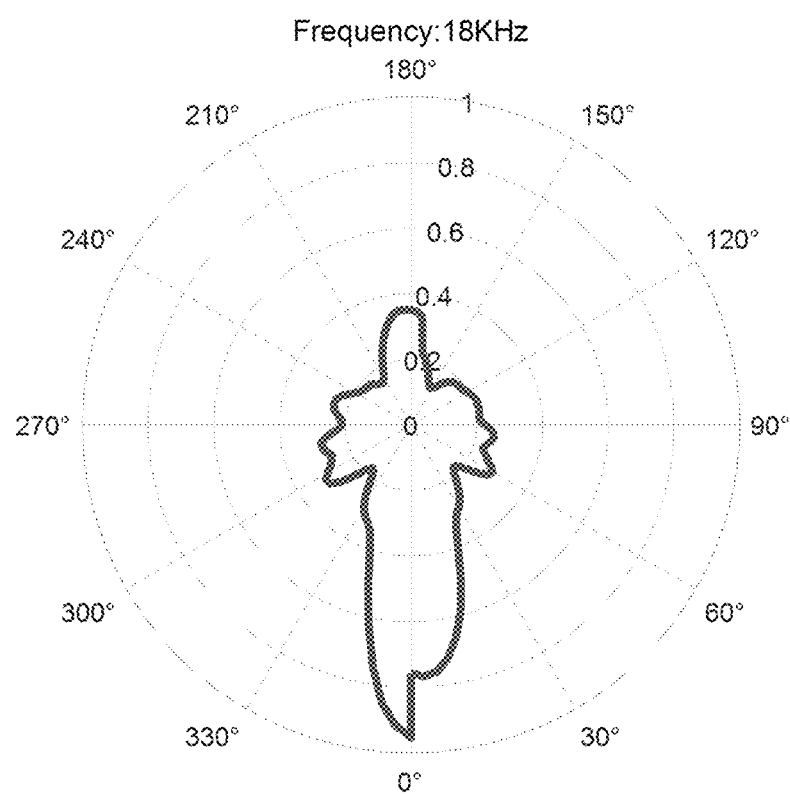
FIG. 9B shows the beam pattern results of metamaterial sonar in the underwater test at the emission signal frequency of 18 kHz.
Figure 9C:
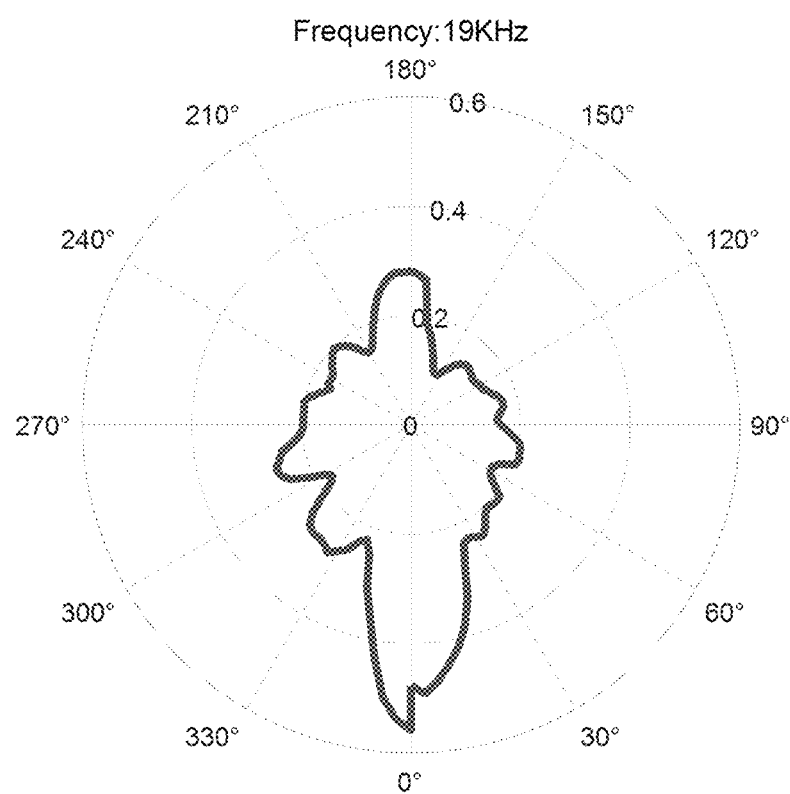
FIG. 9C shows the beam pattern results of metamaterial sonar in the underwater test at the emission signal frequency of 19 kHz.
Figure 9D:
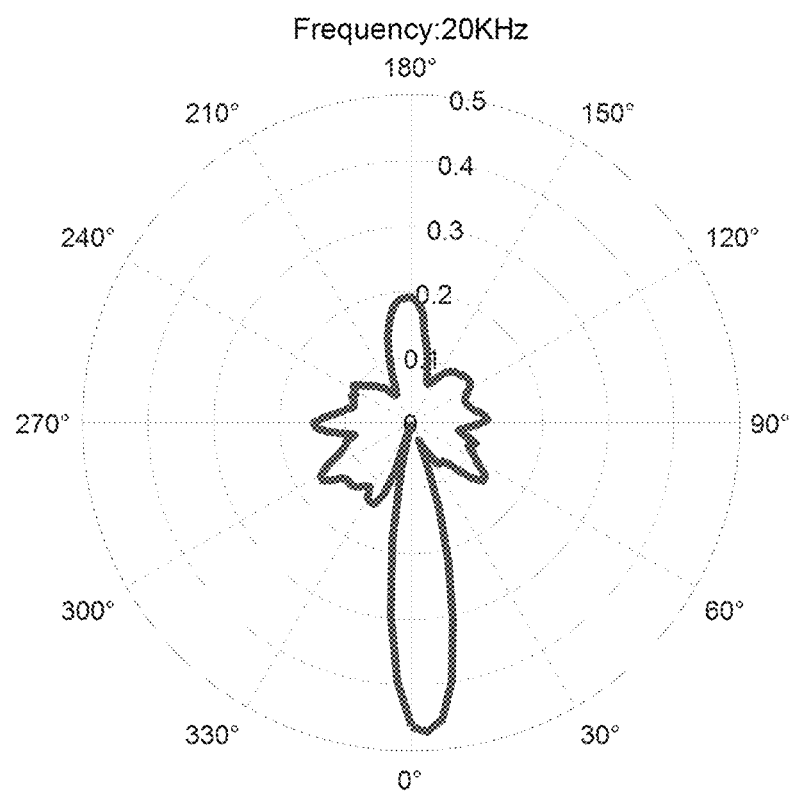
FIG. 9D shows the beam pattern results of metamaterial sonar in the underwater test at the emission signal frequency of 20 kHz.
Figure 9E:
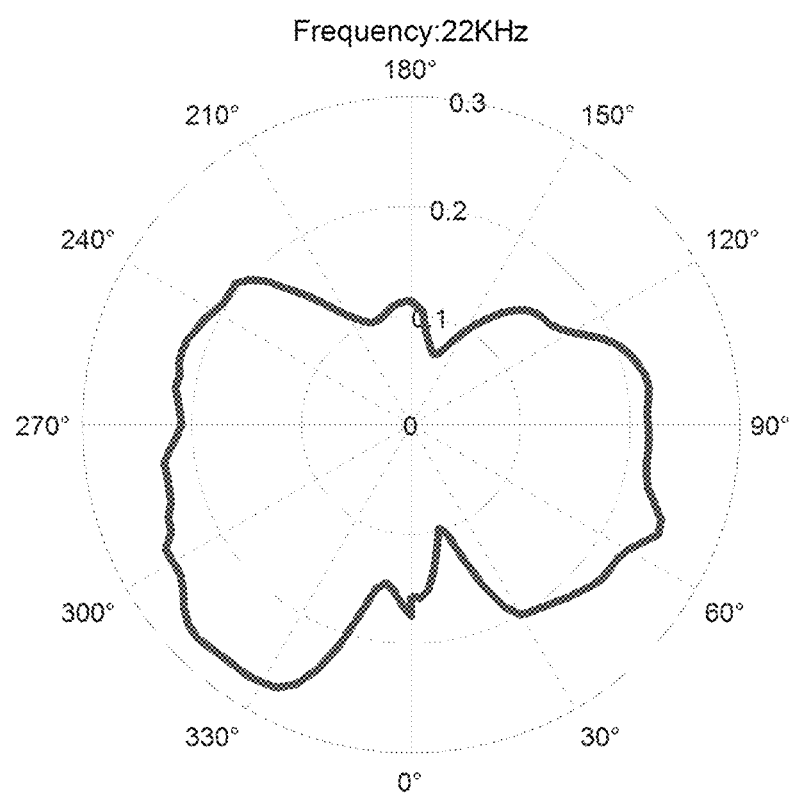
FIG. 9E shows the beam pattern results of metamaterial sonar in the underwater test at the emission signal frequency of 22 kHz.
Figure 9F:
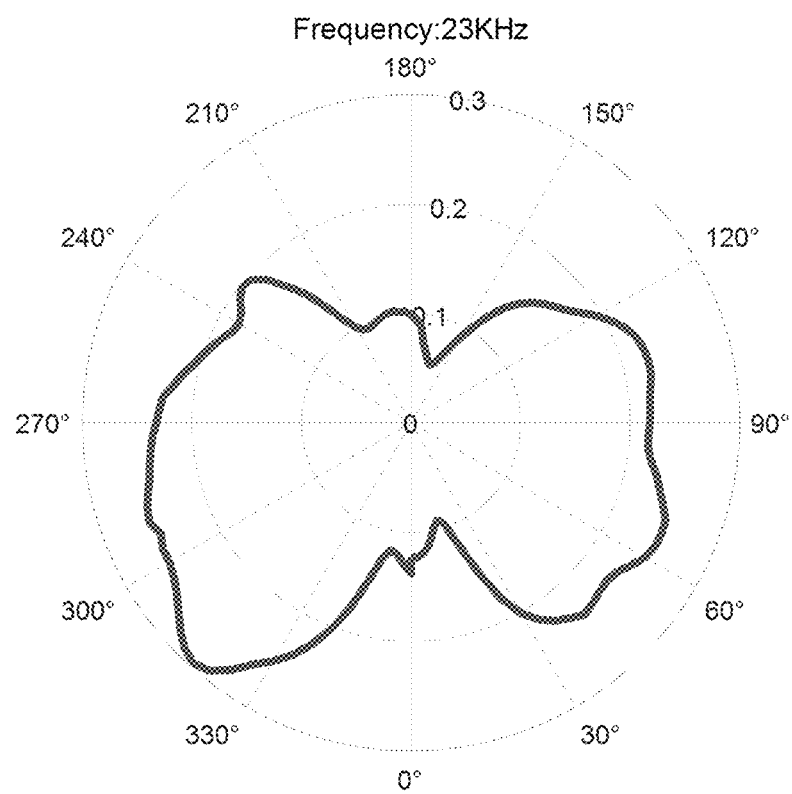
FIG. 9F shows the beam pattern results of metamaterial sonar in the underwater test at the emission signal frequency of 23 kHz.
Figure 9G:
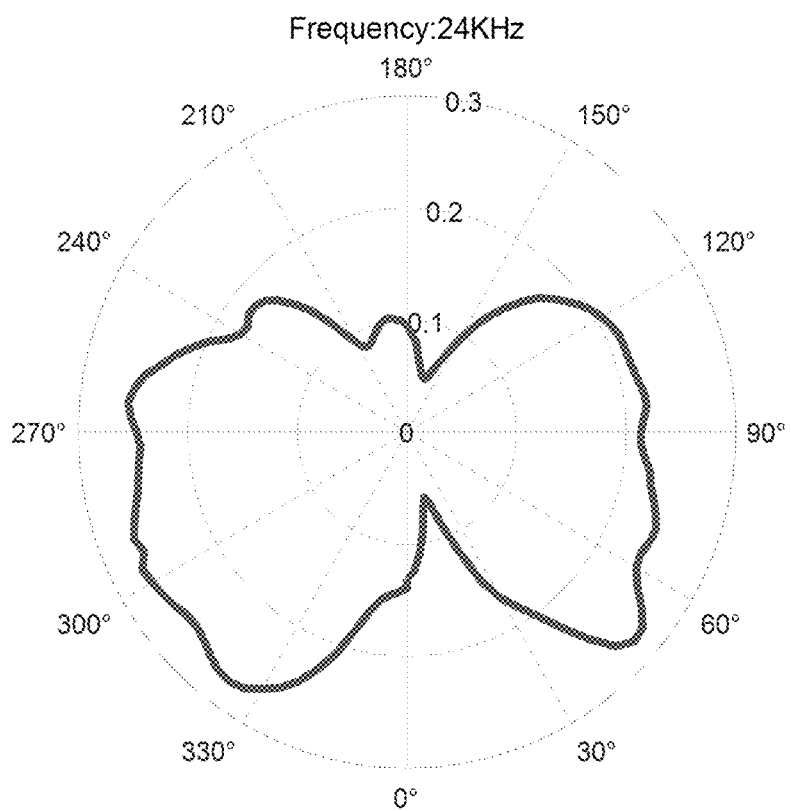
FIG. 9G shows the beam pattern results of metamaterial sonar in the underwater test at the emission signal frequency of 24 kHz.
Figure 9H:
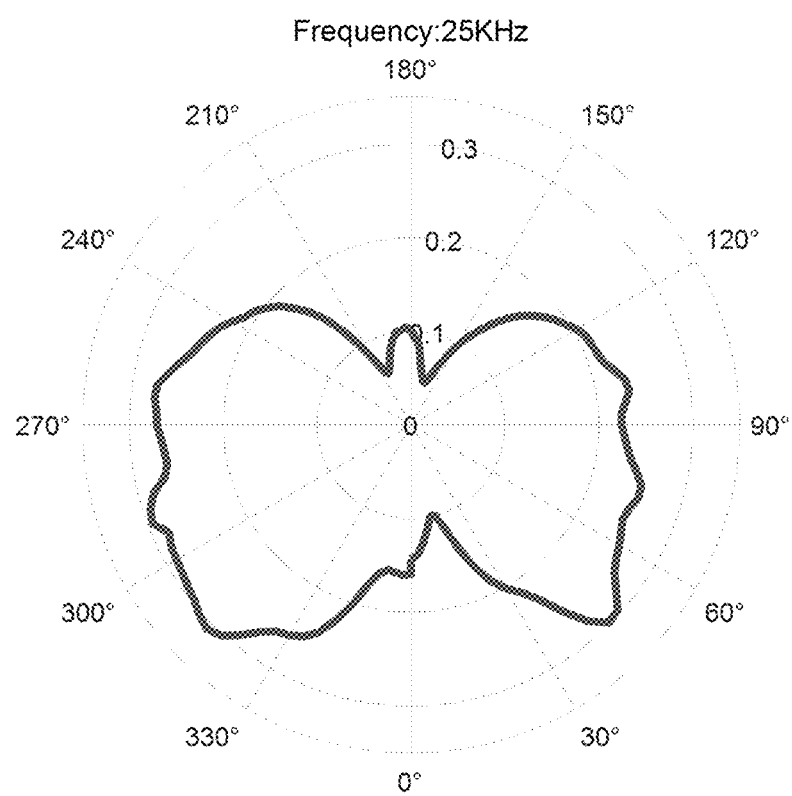
FIG. 9H shows the beam pattern results of metamaterial sonar in the underwater test at the emission signal frequency of 25 kHz.

As shown in FIG. 6 and FIG. 7, the metamaterial sonar is modeled by finite element simulation, and the sound field diagrams at 17 kHz and 24 kHz correspond to the passband and forbidden band modes of metamaterial phononic crystal in FIG. 5. As shown in FIG. 6, when the working frequency of acoustic wave is 17 kHz, it is in the conduction band of metamaterial sonar, and the directivity of radiated acoustic wave radiates downward along the axis of metamaterial sonar, which may be used for underwater navigation and detection. As shown in FIG. 7, when the frequency of the emitted sound wave is 24 kHz, it is in the propagation forbidden band of metamaterial sonar, and the radiated sound wave is prohibited from propagating along the Z axis. Due to the influence of the structure, the sound wave radiates to both sides of the structure in butterfly-shaped beams, which may be used for underwater communication. By changing the emission signal frequency, the metamaterial sonar realizes the integrated function of underwater navigation and communication.

The detailed numerical simulation results are shown in FIG. 8A, FIG. 8B, FIG. 8C, FIG. 8D, FIG. 8E, and FIG. 8F. The emission passband of metamaterial sonar is when the emission signal frequency is 16-17 kHz, and the directivity of the emitted beam is mainly concentrated downward, that is, the acoustic energy emitted by the transducer is mainly concentrated downward, which may be used for underwater detection and navigation. When the emission signal frequency is 22-25 kHz, the sound wave is in the emission forbidden band of the metamaterial sonar, that is, the acoustic wave emitted by the transducer may not be emitted downward along the Z axis through the structure, but radiated around in butterfly-shaped beams, which may be used for underwater acoustic communication. By changing the emission signal frequency, the metamaterial sonar realizes the integration of underwater navigation and communication. Because of the small overall structure, the proposed metamaterial sonar may be easily used in underwater vehicles, and it is expected to be applied in developing marine resources, protecting the marine environment, preventing marine disasters and strengthening the safety of sea areas.

As shown in FIG. 9A, FIG. 9B, FIG. 9C, FIG. 9D, FIG. 9E, FIG. 9F, FIG. 9G and FIG. 9H, the metamaterial sonar may flexibly switch the working state at different frequencies and realize the functions of detection and communication in the anechoic pool. As shown in FIG. 9A, FIG. 9B, FIG. 9C and FIG. 9D, the vertically oriented beam along the z direction at 17-20 kHz may be used for underwater depth and terrain detection (navigation mode). As shown in FIG. 9E, FIG. 9F, FIG. 9G and FIG. 9H, at the working frequency of 22-25 kHz, the beam directivity of sonar radiates to both sides in a butterfly shape. This working mode may realize underwater acoustic communication between UUV.

The above is only preferred embodiments of the disclosure. However, a protection scope of the disclosure is not limited to this. Any equivalent substitution or change made by any person skilled in the art, within a technology scope disclosed herein, in accordance with the technical schemes of the disclosure and its improved conception, shall be covered by the protection scope of the disclosure.

What is claimed is:

1. A navigation-communication-integrated metamaterial sonar for underwater vehicles, comprising: a disc array and a backboard; wherein the disc array comprises a group of uniformly arranged discs with same diameters, same intervals and overlapped axes, and the disc array is located at one side of the backboard; water gaps are arranged between the backboard and the disc array and between two adjacent discs of the disc array; thicknesses g of several water gaps are same, and a transducer is placed at an axial center of one water gap of the disc array; the transducer emits and receives underwater acoustic signals in two ways: receiving and emitting combined or separated; by adjusting a period p of the disc array, a board thickness t1 of each disc, the thickness g of each water gap, a radius $w_1$ of the disc array, a radius $w_2$ and a thickness t2 of the backboard, working states of an underwater navigation and an underwater acoustic communication are flexibly switched by changing working frequencies, and a navigation-communication-integrated sonar is realizable.

2. The navigation-communication-integrated metamaterial sonar for underwater vehicles according to claim 1, wherein the radius $w_1$ of the disc array is 10-50 mm, the period p is 20-55 mm, the board thickness t1 of the each disc is 7-30 mm, the thickness g of the each water gap is 6-25 mm, the radius $w_2$ of the backboard is 18-80 mm, and the thickness t2 of the backboard is equal to the board thickness t1 of the each disc in the disc array.

3. The navigation-communication-integrated metamaterial sonar for underwater vehicles according to claim 2, wherein the transducer is an emitting-receiving combined transducer; a number of the discs in the disc array of a high directivity sonar is 20, an underwater navigation working frequency band is 15-20 kHz, an underwater acoustic communication working frequency band is 21-24 kHz, the radius $w_1$ of the disc array is 22.5 mm, the period p is 30 mm; the board thickness t1 of the each disc is 16 mm; and the thickness g of the each water gap is 14 mm, and the radius $w_2$ of the backboard is 45 mm.

4. The navigation-communication-integrated metamaterial sonar for underwater vehicles according to claim 2, wherein the transducer is the emitting-receiving combined transducer; the number of the discs in the disc array of the high directivity sonar is 18, the underwater navigation working frequency band is 7-10 kHz, the underwater acoustic communication working frequency band is 11-13 kHz, the radius $w_1$ of the disc array is 45 mm, the period p is 55 mm; the board thickness t1 of the each disc is 30 mm; the thickness g of the each water gap is 25 mm, and the radius $w_2$ of the backboard is 80 mm.

5. The navigation-communication-integrated metamaterial sonar for underwater vehicles according to claim 2, wherein the transducer is an emitting-receiving separated transducer; the number of the discs in the disc array of the high directivity sonar is 16, the underwater navigation working frequency band is 25-30 kHz, the underwater acoustic communication working frequency band is 32-36 kHz, the radius $w_1$ of the disc array is 15 mm, the period p is 20 mm; the board thickness t1 of the each disc is 11 mm; and the thickness g of the each water gap is 9 mm, and the radius $w_2$ of the backboard is 35 mm.

6. The navigation-communication-integrated metamaterial sonar for underwater vehicles according to claim 2, wherein the transducer is the emitting-receiving combined transducer; the number of the discs in the disc array of a compact sonar is 10, the underwater navigation working frequency band is 5-8 kHz, the underwater acoustic communication working frequency band is 12-17 kHz, the radius $w_1$ of the disc array is 40 mm, the period p is 53 mm; the board thickness t1 of the each disc is 28 mm; and the thickness g of the each water gap is 25 mm, and the radius $w_2$ of the backboard is 75 mm.

7. The navigation-communication-integrated metamaterial sonar for underwater vehicles according to claim 1, wherein the transducer is the emitting-receiving combined transducer; the number of the discs in the disc array of the compact sonar is 10, the underwater navigation working frequency band is 16-17 kHz, the underwater acoustic communication working frequency band is 22-25 kHz, the radius $w_1$ of the disc array is 22.5 mm, the period p is 30 mm; the board thickness t1 of the each disc is 16 mm; the thickness g of the each water gap is 14 mm, and the radius $w_2$ of the backboard is 45 mm.

8. The navigation-communication-integrated metamaterial sonar for underwater vehicles according to claim 2, wherein the transducer is the emitting-receiving separated transducer; the number of the discs in the disc array of the compact sonar is 10, the underwater navigation working frequency band is 35-39 kHz, the underwater acoustic communication working frequency band is 42-45 kHz, the radius $w_1$ of the disc array is 10 mm, the period p is 13 mm; the board thickness t1 of the each disc is 7 mm; and the thickness g of the each water gap is 6 mm, and the radius $w_2$ of the backboard is 18 mm.

9. The navigation-communication-integrated metamaterial sonar for underwater vehicles according to claim 1, wherein the disc array and the backboard are made of metal.

10. The navigation-communication-integrated metamaterial sonar for underwater vehicles according to claim 1, wherein when the transducer adopts the emitting-receiving separated transducer, a hydrophone is placed at a sixth water gap counted from the backboard towards the disc array; and when the transducer adopts the emitting-receiving combined transducer, the hydrophone is placed at a fifth water gap counted from the backboard towards the disc array.

\* \* \* \* \*